US012109155B2

(12) United States Patent
Allen

(10) Patent No.: US 12,109,155 B2
(45) Date of Patent: Oct. 8, 2024

(54) WHEELCHAIR LIFT ASSEMBLY FOR VEHICLES

(71) Applicant: Johnathan T Allen, Bismarck, ND (US)

(72) Inventor: Johnathan T Allen, Bismarck, ND (US)

( * ) Notice: Subject to any disclaimer, the term of this patent is extended or adjusted under 35 U.S.C. 154(b) by 44 days.

(21) Appl. No.: 18/047,471

(22) Filed: Oct. 18, 2022

(65) Prior Publication Data

US 2024/0122774 A1 Apr. 18, 2024

(51) Int. Cl.
*A61G 3/06* (2006.01)

(52) U.S. Cl.
CPC ............. *A61G 3/062* (2013.01); *A61G 3/067* (2016.11)

(58) Field of Classification Search
CPC .......... A61G 3/062; A61G 3/067; A61G 3/06; A61G 3/061; B60P 1/43; B60P 1/431; B60P 1/438; B60P 1/453; B65G 69/30
USPC .................................................. 414/540, 921
See application file for complete search history.

(56) References Cited

U.S. PATENT DOCUMENTS

| | | | | |
|---|---|---|---|---|
| 5,308,214 | A | 5/1994 | Crain et al. | |
| 5,975,830 | A * | 11/1999 | Goodrich | A61G 3/062 414/812 |
| 7,306,421 | B2 | 12/2007 | Wolfe | |
| 10,470,951 | B2 | 11/2019 | Kitchin et al. | |
| 10,500,110 | B2 | 12/2019 | Taschner | |
| 10,758,433 | B2 | 9/2020 | Schoenian et al. | |
| 2004/0022613 | A1 * | 2/2004 | Kellogg | B60P 1/431 414/537 |
| 2016/0074261 | A1 | 3/2016 | Schoenian et al. | |
| 2021/0106424 | A1 * | 4/2021 | Dimitroulis | A61F 2/2875 |
| 2021/0122295 | A1 * | 4/2021 | Sato | A61G 3/061 |
| 2023/0043284 | A1 * | 2/2023 | Hartsock | B60P 1/43 |
| 2023/0255840 | A1 * | 8/2023 | Dupuy | A61G 3/02 414/495 |

* cited by examiner

*Primary Examiner* — Glenn F Myers
(74) *Attorney, Agent, or Firm* — Southeast IP Group, LLC; Thomas L. Moses

(57) ABSTRACT

A wheelchair lift can be easily installed on a standard truck or SUV, wherein the wheelchair lift includes an extendable and retractable platform, a motorized lifting mechanism, a remote control, and a safety stop mechanism that prevents the wheelchair from rolling off of the platform during use. The wheelchair lift is mountable underneath the driver's side or passenger's side of the vehicle, and folds into a compact unit that is positioned along the base of the vehicle chassis in a position where a running board or step might normally be located. The wheelchair lift may be easily removed from one vehicle and installed on another vehicle.

5 Claims, 9 Drawing Sheets

WHEELCHAIR LIFT ASSEMBLY FOR VEHICLES

FIELD OF THE INVENTION

The present invention relates to lift assemblies attached to vehicles for raising a wheelchair from ground level upwardly to provide ingress and egress for a wheelchair bound user. More specifically, the present invention is a modular wheelchair lift assembly that is self-contained, and may be affixed to standard trucks and sport utility vehicles.

BACKGROUND OF THE INVENTION

Many people who use wheelchairs are licensed to operate motor vehicles. Entering and exiting a motor vehicle can be quite challenging for people with disabilities, and many efforts have been made to develop lift systems for lifting a wheelchair and its occupant to facilitate entry into a vehicle. Unfortunately, such wheelchair lift systems for vehicles tend to be expensive, require extensive modifications to existing vehicles, and suffer from a number of other disadvantages. Once a vehicle has been modified with a wheelchair lift apparatus, it is difficult to remove. Thus, when the time comes for a disabled person to purchase a new vehicle, they are forced to either purchase a specially-made vehicle equipped with a wheelchair lift, or they have to spend significant amounts of money to purchase and install a new wheelchair lift along with a new vehicle.

Examples of previously developed vehicle wheelchair lifts are set forth below, and each of these documents are incorporated herein by reference, in their entireties:

WIPO Patent Publication Number WO2004047708 Motor Vehicle Chair System for Physically Disabled Persons A docking mechanism for mounting in a vehicle (10) movably supports a separable chair (18). The docking mechanism has a turntable, fixed in the vehicle, carrying arms (19) with an articulated lifting device (14) to move the chair vertically and horizontally along the arms. In operation, the chair is maneuvered over the lifting device (14), outside the vehicle, and raised vertically then moved horizontally along the arms to a stowed position inside the vehicle. The chair has powered supporting wheels (25) which are steerable and retractable for stowing. In this manner, an occupant of the chair may enter and exit a vehicle without leaving the chair.

U.S. Pat. No. 7,306,421 Inside Vehicle Lift

The present invention relates to an inside vehicle lift for transferring a load through a rear door opening of a vehicle. The lift comprises a load platform for receiving the load. The load platform is horizontally movable between a loading position with the load platform being disposed behind a rear bumper of the vehicle and a transport position inside the vehicle. Lift actuators move vertically a lift support base with the load platform between a first vertical position with the load platform being in close proximity to ground and a second vertical position suitable for horizontally moving the load platform into the vehicle. The inside vehicle lift is highly beneficial for installation in minivans and SUVs enabling loading of a large number of different commercially available scooters.

U.S. Pat. No. 10,470,951 Wheelchair Lift

A wheelchair lift for a vehicle having a cab with a rear seat. The wheelchair lift includes a lift tray dimensioned to support a wheelchair. An articulating assembly is provided that is configured to move the lift tray transversely between an extended position outside a cab of a vehicle and a retracted position fully within the cab of the vehicle. The wheelchair lift includes a vertical lift assembly configured to raise and lower the lift tray. In some cases, the articulating assembly is mounted to a vertical wall of a vehicle cab between a rear seat and a vehicle door.

U.S. Pat. No. 10,500,110 Wheelchair Loading System

A wheelchair loading system facilitates loading of a wheelchair into a vehicle by the user of the wheelchair without additional assistance from another person. The system includes a rail assembly configured for coupling to a vehicle. A shuttle and a motor are each coupled to the rail assembly to move the shuttle on the rail assembly. A chair mount has a first end couplable to the shuttle and a second end configured for coupling to a wheelchair. The shuttle is positionable at a rearward end of the rail assembly positioning the wheelchair away from the rear door to allow the rear door to be opened while the wheelchair is coupled to the shuttle. A lift is configured for coupling to the vehicle and includes a strap having a free end configured for coupling to the wheelchair for lifting the wheelchair into the vehicle through the rear door.

U.S. Pat. No. 5,308,214 Wheelchair Lift Apparatus

A wheelchair lift apparatus which may be adapted for use in an existing motor vehicle in lieu of a seat structure removably coupled to the floor pan. The lift apparatus includes a motor driven horizontal screw for laterally moving a platform across the vehicle to exit the rear passenger compartment through a side door opening. The platform has a vertical side extension and carries a foldable wheelchair, for example, whose two sides collapse inwardly. The lift apparatus further includes motor driven linkage members for pivoting the platform and folded wheelchair from outside the rear passenger compartment toward the front of the vehicle. The platform and folded wheelchair are next vertically adjusted alongside either the driver or a front seat passenger door opening, depending upon whether the side door opening is on the right or left side of the vehicle. An additional motor driven linkage member is operative for downwardly pivoting the vertical side extension to a coplanar position with the platform so as to extend its effective surface for supporting the unfolded wheelchair, ready to receive the driver or front seat passenger; and a motor driven vertical screw for lowering and raising the platform and wheelchair.

U.S. Pat. No. 10,758,433 Wheelchair Vehicle Entry System

A system for lifting a wheelchair into and out of a vehicle is provided. The system includes a driver side and a passenger side wheelchair supports, a driver side and a passenger side extendable lift assemblies, and a control system. The driver side extendable lift assembly is arranged to move the driver side wheelchair support between a stowed position within the vehicle and a deployed position extended horizontally outside the vehicle and lowered towards the ground. The passenger side extendable lift assembly is arranged to move the passenger side wheelchair support between its stowed position and its deployed position. The control system is configured to independently operate the driver side extendable lift assembly and the passenger side extendable lift assembly to separately or simultaneously move the driver side wheelchair support and the passenger side wheelchair support between their respective stowed positions and their respective deployed positions.

U.S. Patent Publication No. US20160074261 Vehicle Wheelchair Lift

A compact wheelchair lift mechanism utilizes a horizontal actuator to advance the vehicle doors outwardly away from the side of the vehicle together with a wheelchair user supported by a platform, and a vertical actuator which then lowers the platform with the wheelchair and user downwardly between the doors and vehicle. With the platform on the ground next to the vehicle, the user may then roll forward and away from the vehicle. The vehicle doors are also pivotally attached to the lift mechanism, such that a user may exit the vehicle by simply opening the vehicle door about its traditional door hinge, and therefore without powering the actuators. In this way, the wheel chair lift mechanism provides for safe and easy exit from the vehicle even if electrical power is lost, and facilitates use of the vehicle by both wheelchair-using drivers and drivers who do not use a wheelchair.

It would be desirable to provide a wheelchair lift that is modular, inexpensive, and capable of being installed and removed from a vehicle at low cost. Additionally, it would be beneficial to provide a wheelchair lift that is easily installed on standard trucks and sports utility vehicles in a way that it can be easily removed and then installed on a new vehicle.

SUMMARY OF THE INVENTION

In one embodiment, the present invention includes a wheelchair lift that can be easily installed on a standard truck or SLAT, wherein the wheelchair lift includes an extendable and retractable platform, a motorized lifting mechanism, a remote control, and a safety stop mechanism that prevents the wheelchair from rolling off of the platform during use. The wheelchair lift is mountable underneath the driver's side or passenger side of the vehicle, and folds into a compact unit that is positioned along the base of the vehicle chassis in a position where a running board or step might normally be located.

When deployed, the platform extends outwardly in a horizontal direction away from the vehicle, and then locks into place to receive a wheelchair with an occupant. The platform is lowered to ground level, so that a wheelchair may roll onto the platform. Once the wheelchair is situated on the platform, then the safety mechanisms engage to maintain the wheelchair on the platform while the platform is being raised (or lowered).

For storage and transport purposes, the platform raises to its storage level and the platform retracts inwardly toward the vehicle. The platform is divided into two main panels, which nest together with one panel positioned directly above the other. The wheelchair lift may be operated by a fob, a remote control, or an app on a smartphone, tablet, or the like. Other types of control systems may be utilized, as well.

BRIEF DESCRIPTION OF THE DRAWINGS

The drawings and specific descriptions of the drawings, as well as any specific or alternative embodiments discussed, are intended to be read in conjunction with the entirety of this disclosure. The tire and wheel lift assistance assembly may, however, be embodied in many different forms and should not be construed as being limited to the embodiments set forth herein; rather, these embodiments are provided by way of illustration only and so that this disclosure will be thorough, complete and fully convey understanding to those skilled in the art.

DETAILED DESCRIPTION OF THE INVENTION

The present invention includes, in a first embodiment as shown in FIGS. 1-9, a wheelchair lift assembly 10 includes an extendable and retractable platform 12, a motorized lifting mechanism, a remote control, and a safety stop mechanism that prevents the wheelchair from rolling off of the platform during use. The wheelchair lift is mountable underneath the driver's side of the vehicle 100, and folds into a compact unit that is positioned along the base of the vehicle chassis in a position where a running board or step might normally be located.

Figure 6:
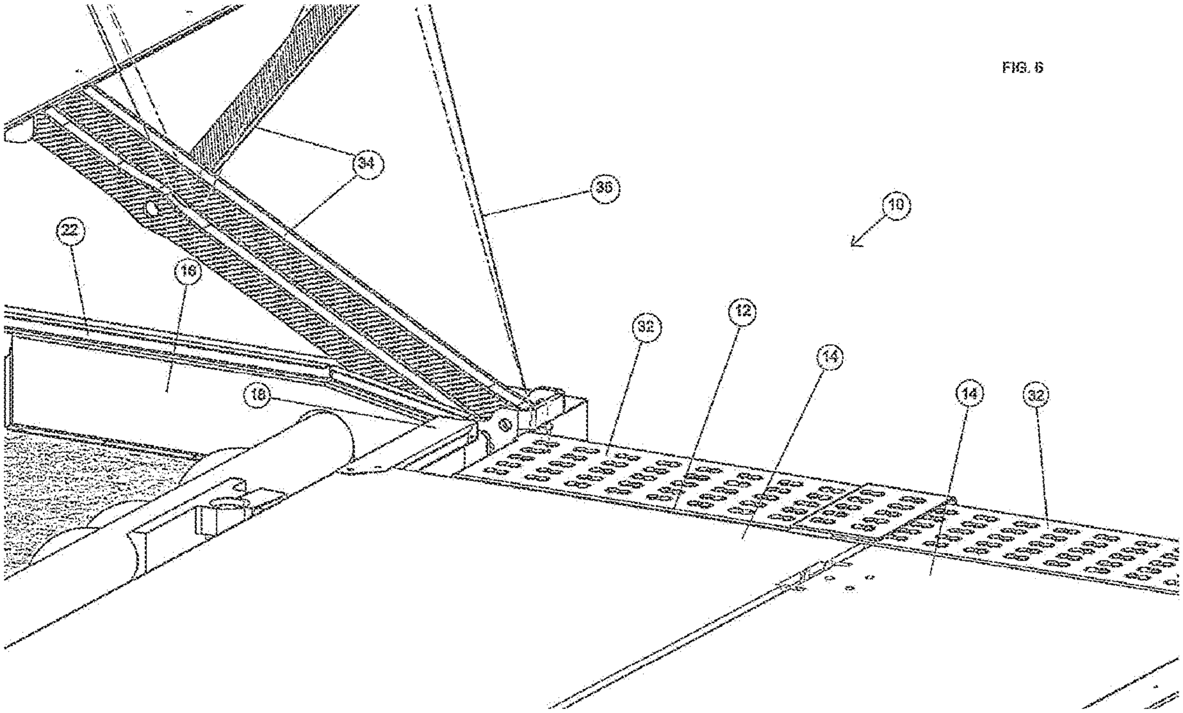
FIG. 6 is a close-in perspective view of one embodiment of a wheelchair lift assembly attached to a vehicle, showing the vertical raising and lowering mechanism that carries the retractable platform vertically upwardly and downwardly, and further showing a first platform panel having a guide member disposed within a track on an inner wall of the housing.

The extendable and retractable platform 12, in a preferred embodiment, is formed from a pair of platform panels 14 that extend outwardly from a housing 16, and are retractable into the housing 16 while not in use. The platform panels 14 nest, in the retracted position, so that the first panel 14 sits on top of the second panel 14, where both panels 14 are positioned in a generally horizontal plane. In the extended position, the panels 14 are positioned adjacent to one another in the same generally horizontal plane. The first platform panel 14 includes side support members 18 that extend in a longitudinal direction, one toward the front of the vehicle 100, and one toward the rear thereof, and each side support member 18 includes a guide member 20 that engages a track 22 along an inner side wall of the housing 16, as shown in FIG. 6. The side support members 18 are guided by the track 22, which situated against the inner side wall in a generally horizontal orientation, with a slight downward bend toward the distal end (away from the side of the vehicle 100) of the housing 16, The guide members 20 on either end of the first platform panel 14 slide along the track 22, so that as the first platform panel 14 extends outwardly from the housing 16, the platform panel 14 drops down vertically as it moves along the track 22, so that the first panel 14 is in the same horizontal plane as the second platform panel 14. The guide members 20 and tracks 22 are similar to the tracks for cabinet drawers, and the guide member 20 may include a roller, or a slidable protrusion that follows the track 22 engaged by the guide member 20.

From a nesting position, where the first platform panel 14 sits above the second platform panel 14, the second platform panel 14 moves outwardly in a horizontal plane, followed by the first platform panel 4, which follows the tracks described above. The first platform panel 14 extends outwardly and then slightly downwardly so that the first and second platform panels 14 are both in the same horizontal plane when the platform 12 is fully extended, as shown in FIGS. 1, 3, 7 and 9.

Figure 7:
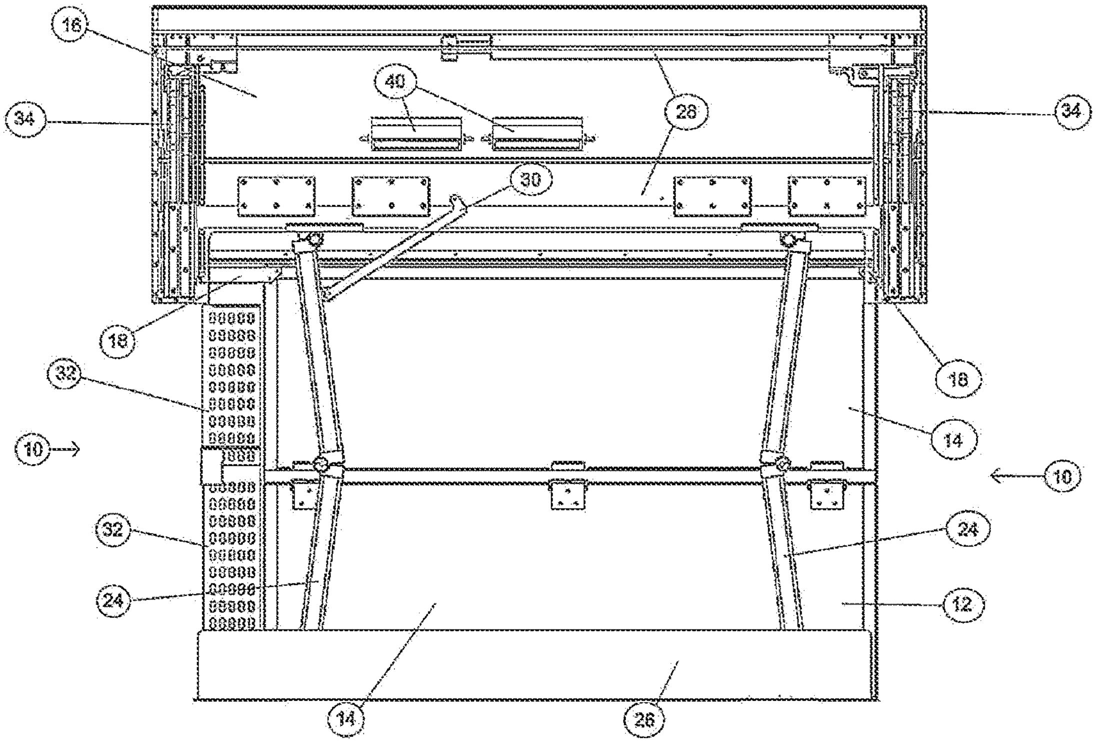
FIG. 7 is a bottom view of one embodiment of a wheelchair lift assembly attached to a vehicle, showing a pair of elbow joint supports, and further showing a linear actuator operatively connected to one of the elbow joints for extending and retracting the platform.

In the fully extended position, the platform 12 is supported by a pair of retractable elbow joint supports 24 disposed beneath the platform 12, as shown in FIG. 7. The elbow joint supports 24 extend from the housing 16 to the outer portion of the second panel 14, where they may be attached to a lip 26 or support that runs underneath the second platform panel 14 along the distal longitudinal edge thereof. Each end of the elbow joint support 24 is hinged, and the elbow joint support 24 is also hinged in a central portion thereof. When the platform 12 is in an extended position, the elbow joint supports 24 are preferably disposed in a generally linear configuration. When the platform 12 is retracted, then the elbow joint supports 24 bend so that they can nest within the housing 16 while not in use.

The extension and retraction of the platform 12 are preferably driven by a first linear actuator 28, which is operatively connected to one of the elbow joint supports 24, as shown in FIG. 7. The linear actuator 28 causes the elbow joint supports 24 to open fully or close fully. In one preferred embodiment, the linear actuator 28 is pivotally attached to a rod 30, which is pivotally attached to one of the elbow joint supports 24. Operating the first linear actuator 28 in one direction causes the platform 12 to extend, and engaging the first linear actuator 28 in the other direction causes the platform 12 to retract inwardly, into the housing 16.

Figure 8:
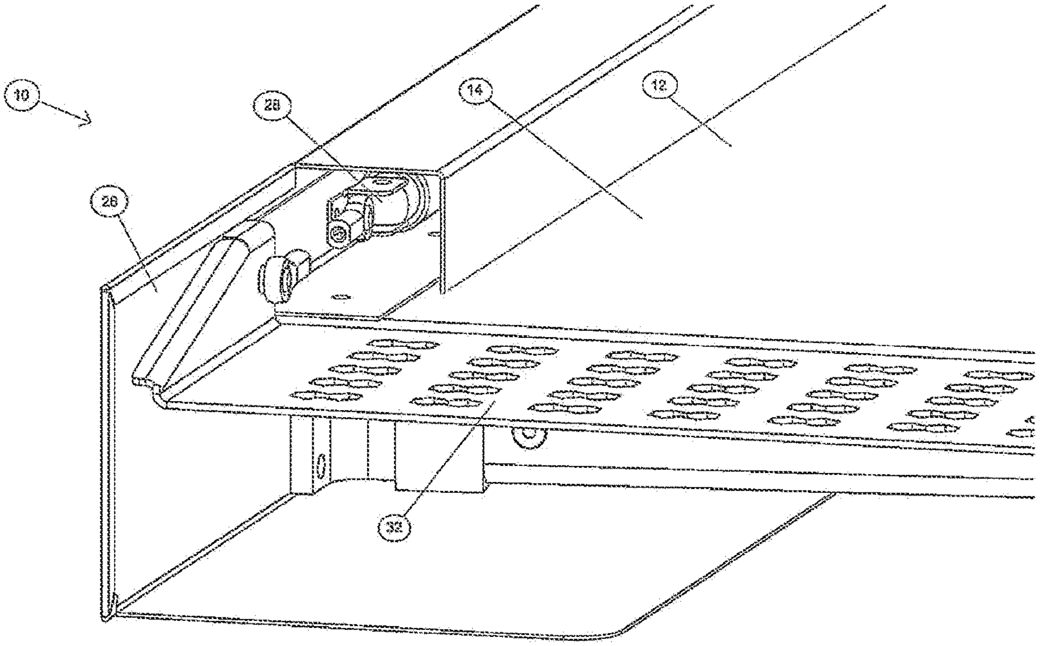
FIG. 8 is a close-in perspective view of a wheelchair lift assembly, showing the hinged safety stop mechanism operatively connected to a linear actuator for raising and lowering the safety stop mechanism.
Figure 9:
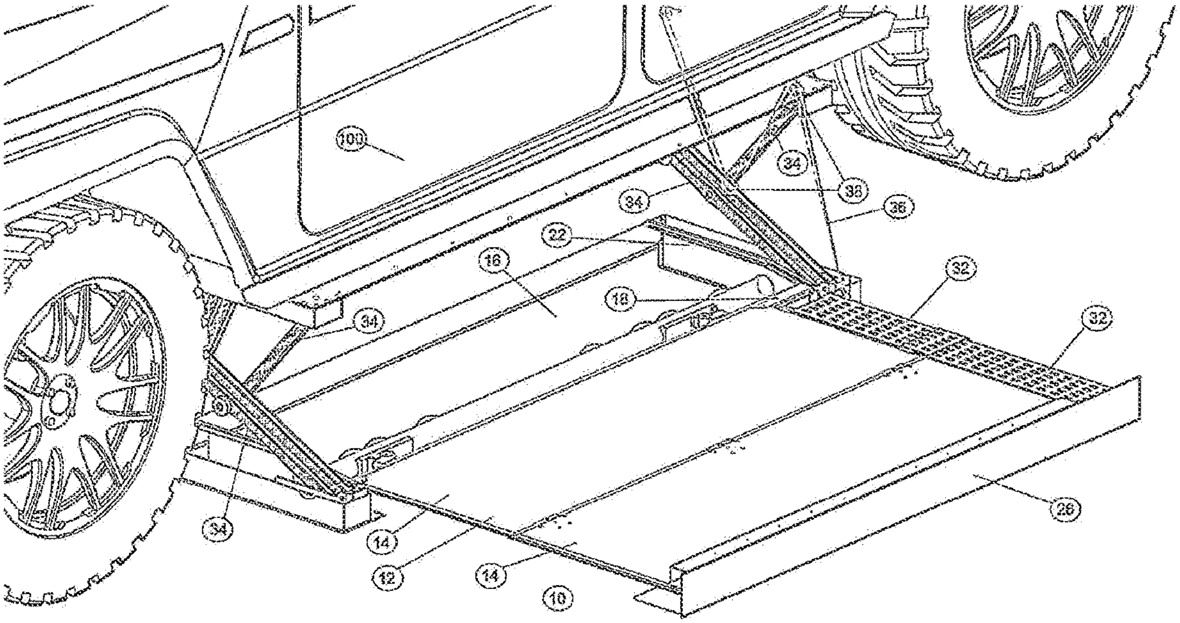
FIG. 9 is a is a perspective view of one embodiment of a wheelchair lift assembly attached to a vehicle, wherein the platform is in a lowered and horizontally extended position.

The platform 12 also includes a safety stop 32, which is a hinged lip that extends along the rear side of the platform 12. Each of the platform panels 14 includes a hinged lip (also referred to herein as a "safety stop" 32) on a rear side thereof (i.e. the side closest to the rear of the vehicle 100), and the hinged lips 32 of each platform panel 14 align into the same common plane when the platform 12 is in the extended position. In the nesting position, the hinged lips 32 sit in a parallel position with one disposed above the other, just like the platform panels 14. When the platform 12 is positioned in the extended position, the hinged lip 32 may be raised upwardly, which creates a barrier along the rear side of the platform 12 to prevent a wheelchair from rolling off of the platform 12 during use. The hinged lip 32 is raised and lowered by a second 1 near actuator 28 that is operatively connected to the hinged lip 32 as shown in FIG. 8.

Figure 1:
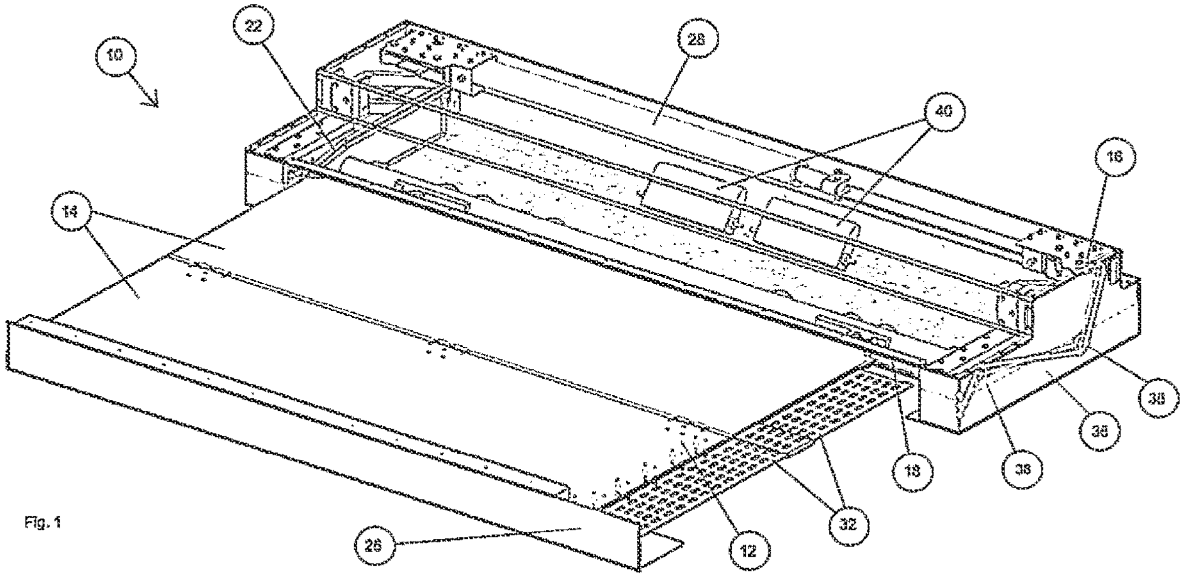
FIG. 1 is a perspective view of one embodiment of a wheelchair lift assembly having an extendable and retractable horizontal platform.
Figure 2:
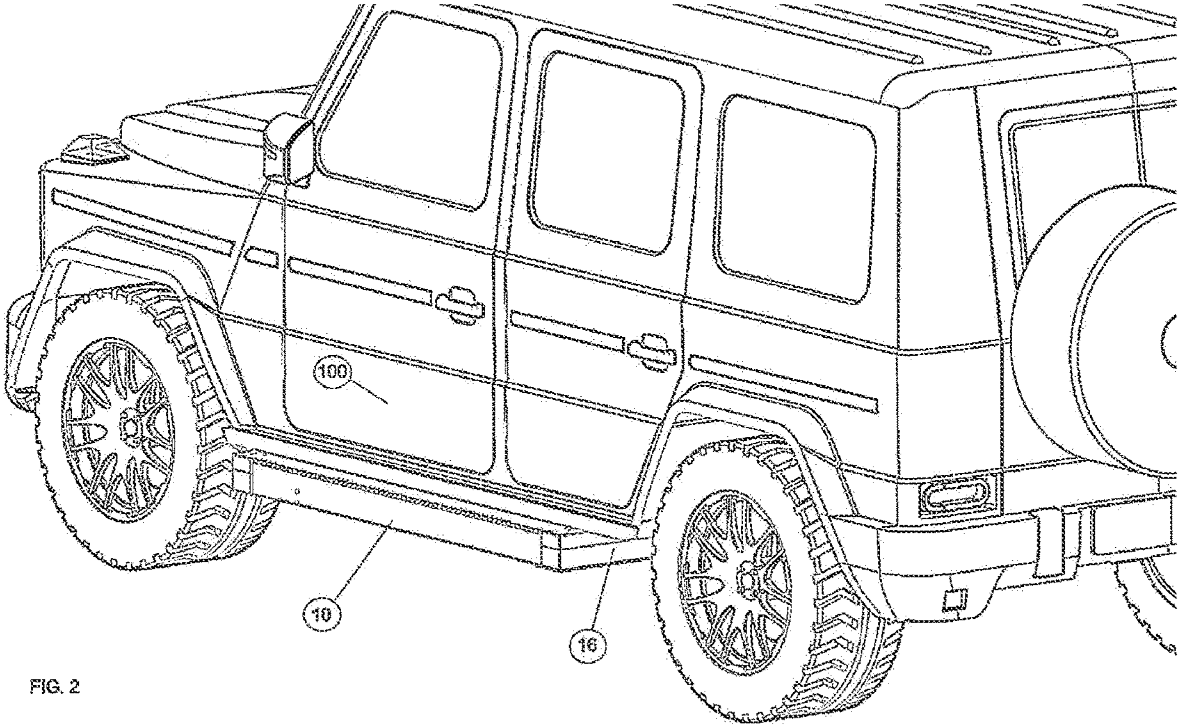
FIG. 2 is a perspective view of one embodiment of a wheelchair lift assembly attached to a vehicle, wherein the wheelchair lift assembly is in a raised and retracted position.
Figure 3:
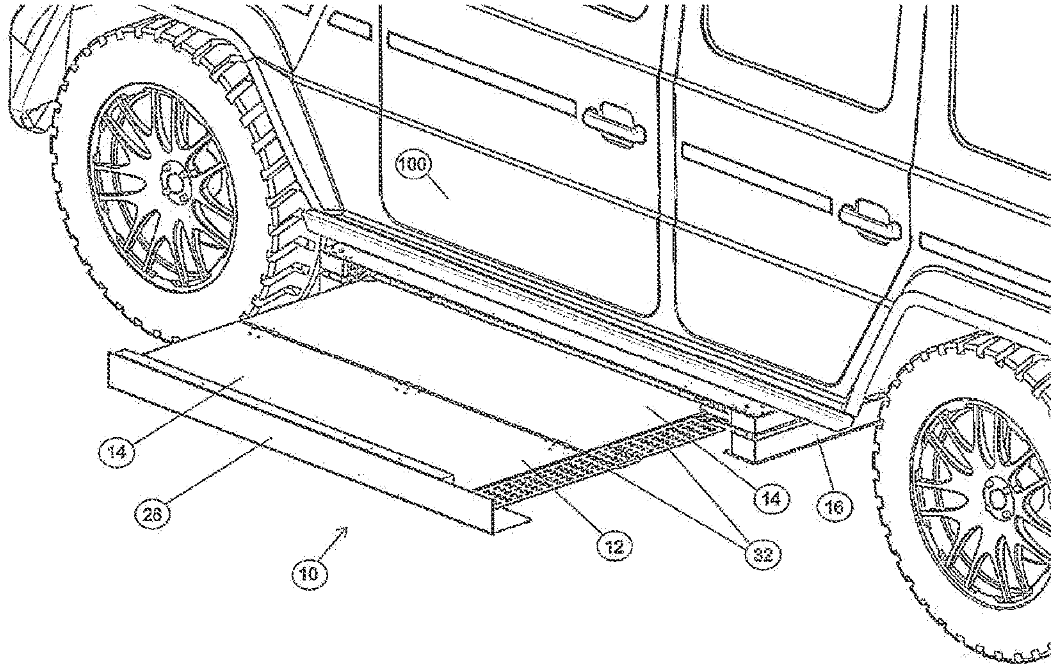
FIG. 3 is a perspective view of one embodiment of a wheelchair lift assembly attached to a vehicle, wherein the platform is in a raised and horizontally extended position.
Figure 4:
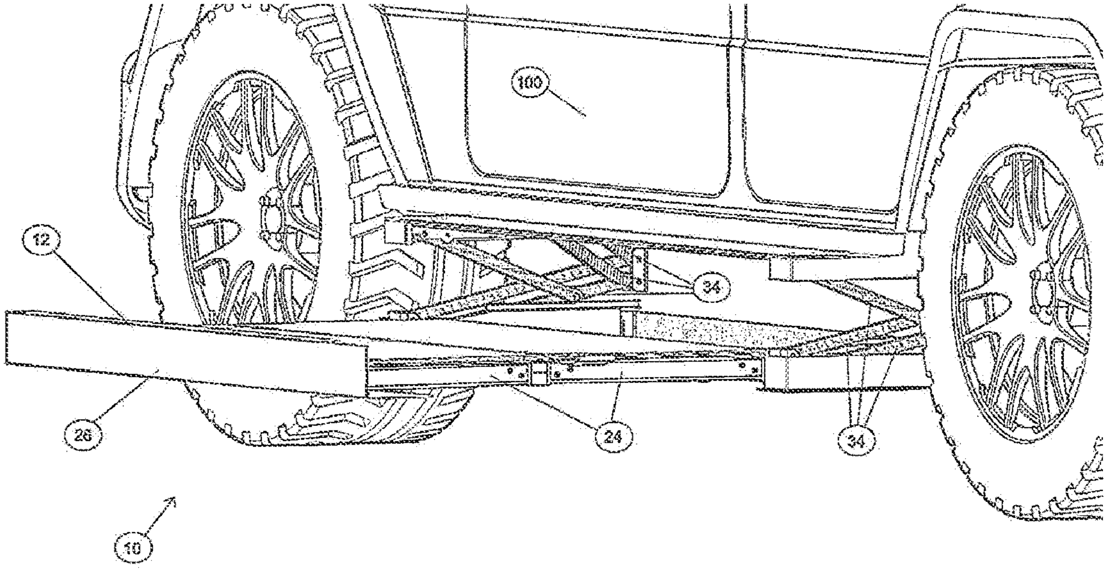
FIG. 4 is a perspective view of one embodiment of a wheelchair lift assembly attached to a vehicle, wherein the platform is in a partially lowered and horizontally extended position.
Figure 5:
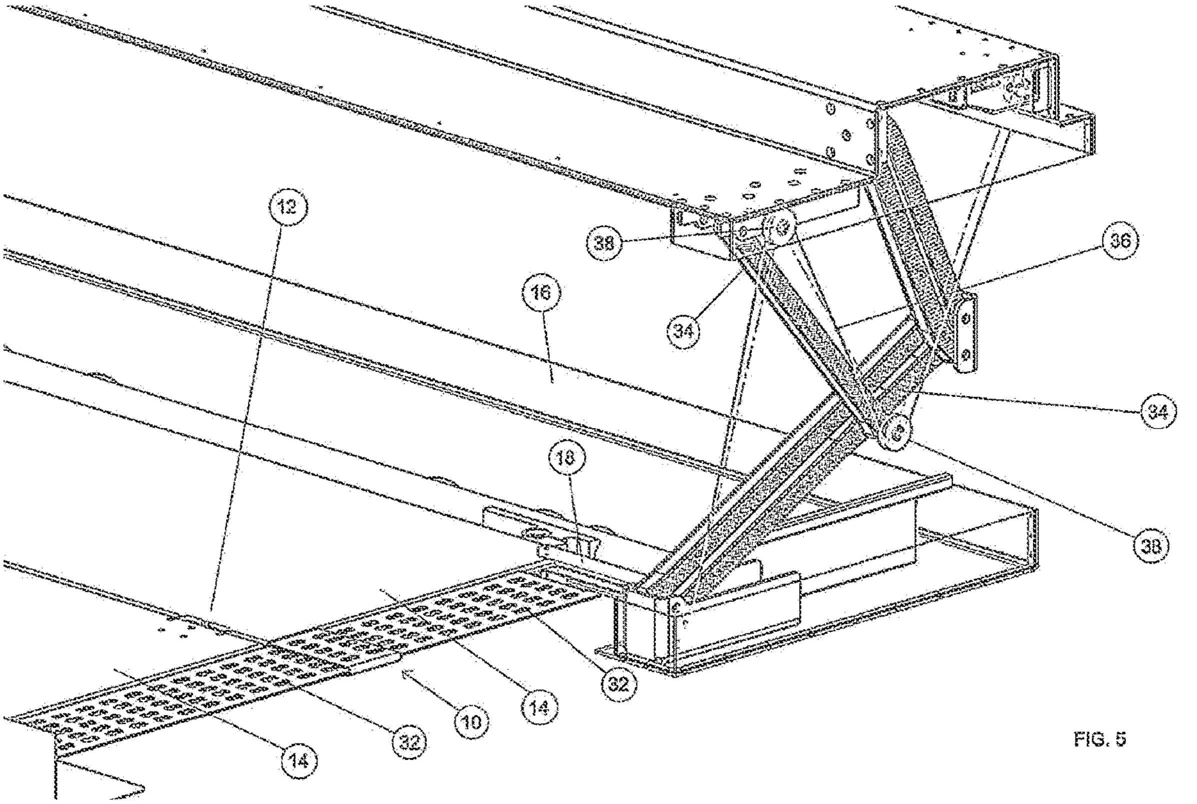
FIG. 5 is a close-in perspective view of one embodiment of a wheelchair lift assembly attached to a vehicle, showing the vertical raising and lowering mechanism that carries the retractable platform vertically upwardly and downwardly.

The platform 12 also moves vertically, in order to lift a wheelchair upwardly, or lower it downwardly, in order to facilitate entry into and egress from the vehicle 100. The platform member 12 is connected to a vertical lift mechanism, which includes hinged support members 34 disposed on the front and rear portions of the housing 16. The hinged support members 34 are operatively connected to a third linear actuator 28 via a cord or cable 36 that is disposed in a zig-zag configuration through a series of pulleys or rollers 38, as shown in FIGS. 1, 4 and 5. When the third linear actuator 28 operates in one direction, it pulls the cord 36 and creates tension, thereby raising the platform 12. Conversely, when the third linear actuator 28 operates in the other direction, the platform 12 is lowered. With no tension on the cord 36, the platform 12 naturally rests in its lowered position via gravity. The linear actuator 28 acts to lift the platform 12 by reducing the effective length of the cord 34 by taking slack out of the cord 34 (creating another bend in the zig-zag configuration, for instance).

It is also contemplated that lights 40 may be mounted onto the apparatus at any desired location, in order to illuminate the platform 12 at night or in dark places. In a preferred embodiment, a pair of LED lights 40 are mounted inside the housing 16 and directed so that they illuminate the platform 12. Additionally, heaters (not shown) may mounted within the housing 16, particularly near the linear actuators 28, and are used to prevent ice buildup and to ensure that cold temperatures do not interfere with the operation of the platform 12, including the vertical lifting and lowering of the platform 12, the operation of the safety stop 32, and the extension and retraction of the platform 12.

The wheelchair lift assembly 10 is preferably powered by its own dedicated battery, which, in a preferred embodiment, is operatively connected to the alternator of the vehicle 100 in order to maintain a charge at all times. For purposes of installation, the wheelchair lift assembly 10 is simply mounted underneath the vehicle chassis below the driver's side side door (although it may also be mounted beneath a passenger side door or a rear door on some vehicles, as desired), and the wheelchair lift battery is electrically connected to the fuse box of the vehicle 100. Alternatively, a solar panel may be mounted in any desired location on the vehicle 100 or on the wheelchair lift assembly 10, and may be connected to the wheelchair lift battery to maintain a charge.

The wheelchair lift assembly 10 may be operated by any conventional means, but is preferably operated by a remote control. The remote control may be a dedicated one, like the remote control for a television, or it may be in the form of a FOB (as used on many vehicles today for locking and unlocking purposes), or may be in the form of an application ("app") on a smartphone, tablet or similar computing device. By using the remote control, a user can operate the full functionality of the wheelchair lift, including the extension and retraction of the platform, the vertical lifting and lowering of the platform 12, and the raising and lowering of the safety stop 32. In a preferred embodiment, the wheelchair lift assembly 10 may include a programmable logic controller (or a similar electronic control device) for operation, so that certain functions can be automated. For example, in a preferred embodiment, the safety stop 32 automatically engages before the platform 12 moves upwardly or downwardly.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

I claim:

1. A wheelchair lift assembly comprising:

a housing a hinged lifting and lowering mechanism attached to said housing;

a horizontally extendable and retractable platform attached to said hinged lifting and lowering mechanism, so that said platform nests within said housing in a horizontally retracted position and extends outwardly away from said housing in an extended position;

a hinged safety stop mechanism attached to one edge of said platform, wherein said hinged safety stop moves between an upward position for creating a barrier along said one edge of said platform and a lower position for removing said barrier;

wherein said platform comprises first and second platform panels that are disposed in parallel, stacked relation when said platform is in a retracted position, and which are disposed in a common, generally horizontal plane when said platform is in an extended position;

wherein a pair of hinged elbow joint supports are disposed beneath said platform panels; and wherein a linear actuator is operatively attached to one of said hinged elbow joint supports so that said linear actuator extends and retracts said platform by extending and retracting said one of said hinged elbow joint supports.

2. The wheelchair lift assembly set forth in claim 1, further comprising:

a linear actuator operatively connected to said lifting and lowering mechanism for raising and lowering said platform.

3. The wheelchair lift assembly set forth in claim 2, wherein said linear actuator is connected to a first end of a cord, and wherein a second end of said cord is operatively attached to said platform.

4. The wheelchair lift assembly set forth in claim 1, further including a linear actuator operatively connected to said hinged safety stop mechanism so that said linear actuator raises and lowers said hinged safety stop mechanism.

5. The wheelchair lift assembly set forth in claim 1, further including at least one light attached to said housing for illuminating said platform.

* * * * *